260. CHEMISTRY, CARBON COMPOUNDS.

418

Search Roo

Feb. 12, 1935. B. CLAYTON ET AL Re. 19,456

PROCESS OF PRODUCING POWDERED SOAP OF LOW MOISTURE CONTENT Orig. 1,968,526

Original Filed April 17, 1933 2 Sheets-Sheet 1

INVENTORS,
Benjamin Clayton
Walter B. Kerrick
Henry M. Stadt,
By Fred W. Lamie
ATTORNEY.

9

Feb. 12, 1935. B. CLAYTON ET AL Re. 19,456

PROCESS OF PRODUCING POWDERED SOAP OF LOW MOISTURE CONTENT

Original Filed April 17, 1933 2 Sheets-Sheet 2

INVENTORS,
Benjamin Clayton,
Walter B. Kerrick,
Henry M. Stadt,
BY Fred W. Lamm
ATTORNEY.

Reissued Feb. 12, 1935

Re. 19,456

UNITED STATES PATENT OFFICE 19,456

PROCESS OF PRODUCING POWDERED SOAP OF LOW MOISTURE CONTENT

Benjamin Clayton, Sugarland, Tex., and Walter B. Kerrick, Los Angeles, and Henry M. Stadt, Glendale, Calif., assignors, by direct and mesne assignments, to Refining, Inc., Reno, Nev., a corporation of Nevada Original No. 1,968,526, dated July 31, 1934, Serial No. 666,470, April 17, 1933. Application for reissue November 24, 1934, Serial No. 754,686

38 Claims. (Cl. 87—16)

Our invention relates to the manufacture of soap. Soap is produced by the saponification of fats by suitable reagents. The term "fat" as used herein includes all those fats, oils, and greases which are commonly used in soap manufacture, including tallow and other animal fats, cottonseed oil, and other vegetable fats, and the fish oils.

The term "reagent" as used herein includes all those substances which are adapted to produce a saponification of fats, those most commonly employed being caustic potash or caustic soda in aqueous solution.

It is an object of our invention to provide means by which soap can be produced by a continuous process; that is, a process by which the raw material needed for the production of soap is fed continuously into an apparatus in which the soap is formed and from which the soap is continuously delivered.

It is also an object of our invention to provide means for producing powdered soap directly from said raw materials. The term "powdered soap" is used herein to designate a soap in the form of granules averaging about one-sixteenth of an inch in diameter or thereabouts. The size of the granules is not critical and the size of granule may be varied to suit various needs.

It is a further object of our invention to provide means for producing soap of a low moisture content. It is not unusual for soaps to contain at least fifty per cent of water, and for many purposes soap which contains much less water is highly desirable. By our process soaps containing any desired water content can be continuously produced.

Further objects and advantages will be made evident hereinafter.

Our invention can be conveniently practiced in the apparatus disclosed in the attached drawings, in which—

Figure 1:
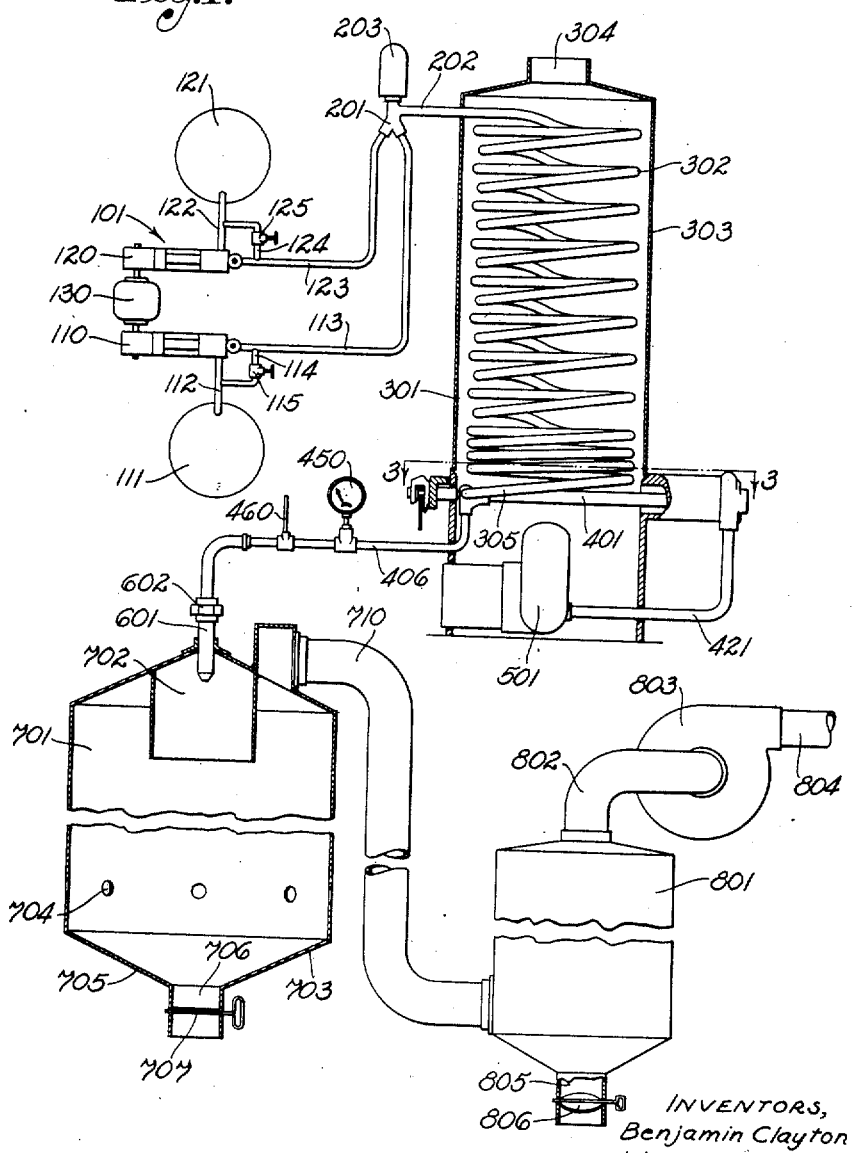
Fig. 1 is a general assembly view of the apparatus, a portion of this apparatus being shown in section.

In the form of the invention shown in the drawings we provide a mixture proportioning device 101, a mixer 201, a heater 301, a steam proportion controller 401, a fuel burner 501, a nozzle 601, an expansion chamber 701, and a dust separator 801. The mixture proportioning device 101 includes a fat pump 110 and a reagent pump 120.

The fat pump 110 and the reagent pump 120 are driven from a motor 130 so that they run at all times at proportional speeds. The fat pump 110 takes fat from a tank 111 through a pipe 112, the fat tank 111 being provided with heating means so that the fat can be preheated to any desired degree. The fat pump 110 delivers the heated fat to a pipe 113. A by-pass pipe 114 provided with a valve 115 is provided connecting the pipe 113 to the pipe 112 so that a portion of the fat may be by-passed through the valve 115 to control the rate of delivery of fat from the pump 110 to the mixer 201.

The reagent pump 120 takes reagent from the tank 121 through a pipe 122 and delivers it to a pipe 123. A by-pass pipe 124 having a valve 125 connects the pipe 123 to the pipe 122 so that reagent may be by-passed through the valve 125, the amount of reagent delivered to the pipe 123 being controlled by the valve 125.

The reagent tank 121 is provided with heating means so that the reagent may be preheated to any desired degree before being delivered to the pipe 123.

The mixer 201 may have any desired form, that shown being a simple Y-connection in which a stream of fat from the pipe 113 and a stream of reagent from the pipe 123 are mixed together and delivered to a pipe 202. For the purpose of equalizing the flow of liquid, an air chamber 203 may be provided in the pipe 202.

The pipe 202 is connected to a pipe coil 302 forming a part of the heater 301. This pipe coil is preferably of helical or spiral form and is carried inside a shell 303 connected at its upper end to a flue 304. The hot products of combustion delivered from the burner 501 pass upwardly inside the shell 303 and outwardly through the flue 304, thus heating the liquid in the coil 302.

Figure 2:
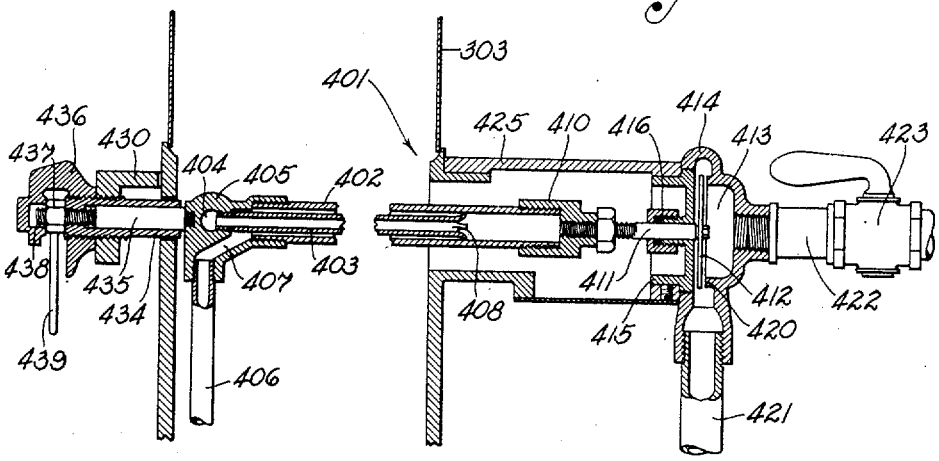
Fig. 2 is an enlarged section of a portion of the apparatus.
Figure 3:
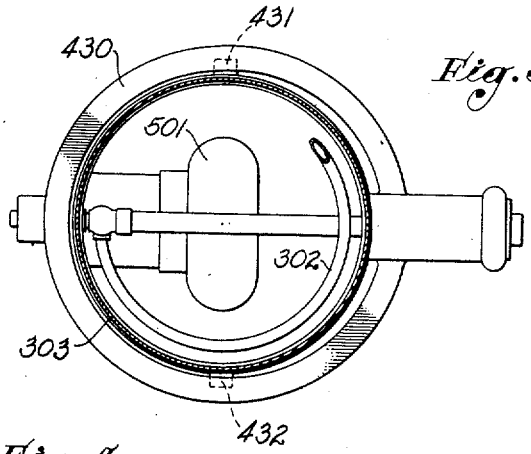
Fig. 3 is a section on a plane represented by the line 3—3 of Fig. 1.
Figure 4:
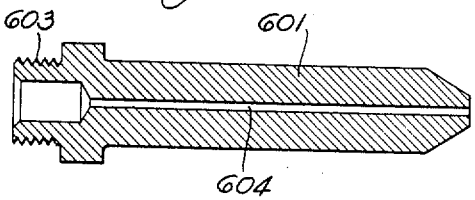
Fig. 4 is a sectional view on an enlarged scale of the nozzle.

The lower end of the coil 302 is connected through a pipe 305 with the steam proportion controller 401 which is shown in more detail in Fig. 2. The steaf proportion controller 401 consists of an outer pipe 402 and an inner pipe 403. Liquid from the pipe 305 is delivered to an opening 404 in a member 405. The inner pipe 403 is secured in the member 405 so that the interior of the pipe is in open communication with the opening 404. An outlet pipe 406 is also secured in the member 405 communicating with an opening 407. The pipe 402 is secured in the member 405 so that the interior of this pipe is in open communication with the opening 407. The other end 408 of the inner pipe 403 is open and provides an open communication with the interior of the pipe 402. The other end of the pipe 402 is connected into a member 410 which closes the end of the pipe 402 and which is threaded to receive a valve stem 411. The end of the valve stem 411 is secured to a valve disc 412 which is carried in a cavity 413 in a member 414. The member 414 has secured therein a closure member 415 through which the valve stem 411 passes, a stuffing-box 416 being provided about the valve stem 411 where it passes through the member 415.

An annular seat 420 is provided in the cavity 413 against which the valve disc 412 seats. A gas outlet pipe 421 is secured in the member 414 in such a manner that it communicates with the space at the left of the valve disc 412 when it is seated, and a gas inlet pipe 422 is also secured in the member 414 communicating with the space to the right of the valve disc 412 when it is seated. A gas control valve 423 may be provided in the pipe 422.

The member 415 is secured in a member 425 which in turn is secured to the shell 303. Connected to the member 425 is a ring 430 which extends around the shell 303, being separated therefrom and resting on lugs 431 and 432 secured to the shell 303. A member 434, shown in Fig. 2, is secured in the member 430 and forms a guide for a stem 435 which projects through the shell 303 and is secured in the member 405. A member 436 is secured on the member 434 and is provided with a cavity in which a control nut 437 is placed, this control nut engaging the threaded end 438 of the stem 435. The control nut 437 is provided with a handle 439 by which it may be turned. As the nut 437 is turned, the stem 435 is moved to the right or left, depending upon the direction of rotation.

A pipe 406 conducts liquid to the nozzle 601 and is provided with a pressure gage 450 and a thermometer 460. The nozzle 601 is secured to the pipe 406 in such a manner that it can be easily removed as by means of a pipe union 602. The nozzle 601 is shown in Fig. 5 and consists of a cylindrical member threaded at 603 for connection to the pipe 406 and is provided with a small opening 604 through which the liquids are caused to pass at high velocity and with a considerable pressure drop. The nozzle 601 projects into a space 702 inside the expansion chamber 701 which is provided with an outer shell 703 and with openings 704 near the bottom thereof. The bottom of the shell 703 is preferably conical as shown at 705 and terminates in an outlet opening 706 closed by a gate 707. The upper end of the space 702 is connected through a conduit 710 with a dust collector 801. Any form of centrifugal dust separator may be used as a dust collector 801, that shown being provided with an air outlet 802 to which a suction blower 803 is connected, this blower discharging air through a conduit 804. The lower end of the dust collector is provided with an outlet 805 having a gate 806 therein.

The fuel burner 501 may be of any desired form suited to burn gas, oil, or other fuel of liquid or semi-liquid character. This fuel is delivered to the burner 501 through the pipe 421, the amount of fuel so delivered being controlled by the valve disc 412.

The operation of the above-described apparatus will be better understood if the function of the various parts is first explained.

The function of the proportioning device 101 and mixer 201 is primarily to deliver a properly proportioned mixture of fat and reagent to the heater 301 by placing sufficient pressure on the mixture to force it to flow through the heater 301 and the nozzle 601. This function is in part performed by the pumps 110 and 120 which force the fat and reagent to flow against this pressure. Although the two pumps 110 and 120 are employed in the apparatus shown, one (110) pumping fat and the other (120) pumping reagent, it is obvious that the reagent could be mixed in proper proportion with the fat in the tank 111 by installing a mechanical mixer therein and the mixture pumped by the pump 110. The pump 120 and the mixer 201 could then be omitted. The use of two pumps 110 and 120 and the mixer 201 is, however, an excellent way to insure that a properly proportioned mixture of fat and reagent is delivered to the heater 301.

The function of the mixer 201 is merely to provide a means for uniting the fat and reagent. This function is accomplished by bringing together a stream of fat and a stream of reagent. No means is shown for dispersing the reagent in the fat and no such means is necessary although various types of mechanical or jet mixers might be employed.

Using the apparatus as shown, the function of the proportioning device 101 is to supply fat and reagent in measured quantities which bear such proportion to each other that complete saponification is insured. This function is performed by delivering into the mixer 201 for each gallon of fat delivered thereto a defnite quantity of reagent. Other means for providing the proper proportioning of the fat and reagent could obviously be employed.

The function of the heater 301 is to heat the mixture of fat and reagent flowing therein. In the apparatus shown a pipe coil 302 externally heated by combustion products from the burner 501 is employed. It is not essential that the heater should be in the form of a coil, although this is a convenient form of heater to use. It is also not essential that the heater should be heated directly by combustion products since the heater might be immersed in steam or hot oil. It is, however, essential that the heating should be capable of automatic control, as hereinafter explained.

The function of the steam proportion controller 401 is to control the proportion of water in the finished soap, this function being performed by automatically regulating the proportion of steam in the mixture delivered to the nozzle 601. The steam proportion controller may be adjusted by the operator to vary the proportion of the steam.

The steam proportion controller 401 controls the position of the valve disc 412 by the expansion and contraction of the outer tube 402. As the tube 402 expands it tends to seat the valve disc 412 on the seat 420 and thus shut off the flow of fuel from the pipe 422 to the pipe 421 and thus supply less fuel to the burner 501. As the tube 402 contracts it tends to pull the valve disc 412 away from the seat 420 and thus allow more fuel to flow to the burner 501.

The expansion of the tube 402 depends upon its mean temperature which depends upon the rate at which the tube absorbs heat from the flue gases, the rate of conduction of the heat through the wall of the tube, and the rate at which heat is absorbed from the inner wall of said tube.

With the apparatus in operation the rate at which the tube absorbs heat does not vary directly with the amount of fuel burned since the temperature of the combustion products delivered from the burner is fairly constant regardless of whether the burner is receiving fuel at its full capacity or at half capacity. The rate of heat absorption at the outer surface of the tube while no means constant does not increase directly in proportion to the amount of fuel being burned and for small changes in the amount of fuel burned may be regarded as constant.

The rate at which the heat is conducted through the wall of the tube 402 is also fairly constant. The expansion and contraction of the tube 402 is mainly affected by the amount of heat transferred from the inner wall of the tube, and this is mainly dependent on the amount of water that has been turned into steam before the mixture of soap and water enters the tube 402. If no steam has been previously formed, the heat transfer is very high; if all the water has been transformed into steam, the heat transfer is very low.

By turning the handle 439 the member 405 can be moved to the right or left, which regulates the closing of the valve disc 412 on the seat 420 for a given expansion of the tube 402. If the handle is turned in one direction, the mean temperature of the tube 402 must be greater to move the valve disc 412 against the seat 420 than if it is turned in the other. The operator is thus able to insure the valve disc 412 interrupting the flow of fuel to the burner 501 at either a large or a small expansion of the tube 402. Since this expansion is dependent on the amount of steam carried in the soap, the operator by turning the handle 439 in one direction can insure the valve disc seating with no steam in the soap, and by turning the handle 439 in the other direction can insure the valve disc seating only when all the water has been turned into steam.

Since the position of the valve disc 412 controls the amount of fuel passing to the burner 501, it also controls the volume of the products of combustion and heat units carried therein and thus controls the amount of heat delivered to the coil 302. If at any instant the proportion of steam in the soap mixture passing through the tube 402 falls, the tube contracts, thus moving the disc 412 to the left and increasing the flow of fuel to the burner and applying more heat to the coil 302 until a balance is again obtained.

The device shown in Fig. 2 is a very efficient one for insuring that the soap flowing through the tube 402 to the nozzle 601 shall contain a definite proportion of steam. It will be obvious to one familiar with the properties of steam that as long as the soap contains any saturated steam and any free water, that the soap will remain at the temperature of saturated steam at the pressure under which it is held. In other words, the proportion of steam can vary from a mere trace to a quantity representing nearly one hundred per cent of the water without any change in the temperature of the soap.

In actual operation the tube 402 expands and contracts to insure a proper proportion of steam in the soap flowing therethrough even though there is no change in temperature of the soap, this expansion and contraction being caused by a change in the rate of heat transfer from the inner wall of the tube 402 to the soap flowing therein. This change in heat transfer is due to a larger or smaller proportion of steam in the soap.

It will be seen that the ordinary form of thermostat which responds to changes of temperature only could not be used to control the proportion of steam, since as long as both water and saturated steam are present in the soap at a given pressure, the temperature cannot change regardless of the proportion of steam.

The function of the nozzle 601 is primarily to stabilize the rate of steam formation in the soap, which is accomplished by making considerable pressure drop in the soap passing through the constricted orifice 604. This orifice should be made of such size that with the pumps 110 and 120 running at normal speed and the apparatus adjusted to vaporize at least ten per cent of the water in the mixture flowing through the coil 302, the drop in pressure at the nozzle 601 is greater than the drop in pressure in the coil 302.

The drop in pressure in the nozzle 601 depends upon the rate of flow of the mixture of soap and steam therethrough. This rate of flow in turn depends upon the volume of mixed soap and steam which so passes. At 100 pounds per square inch gage pressure, saturated steam has a volume 237 times that of water at 39° F. It is therefore obvious that the vaporization of a relatively small part of the water carried in the soap enormously increases the volume of the soap and steam, which in turn enormously increases the velocity of the mixture of soap and steam flowing through the opening 604. The pressure drop in the constricted opening 604 increases much faster than the velocity of the mixture passing therethrough and probably nearly as the square of this velocity.

Any increase therefore in steam formation in the coil 302, which is fed with water at a constant rate, increases the velocity in the constricted opening 604 and increases the pressure necessary to produce this velocity; that is, the pressure in the tube 302. The water in the tube having been at the temperature of saturated steam at the pressure prevailing therein, it is obvious that any increase in this pressure checks steam formation since steam will not form at the higher pressure until the temperature of the entire mixture is raised to the temperature of saturated steam at the higher pressure.

Conversely, if the amount of steam formed falls off for any reason, the velocity of the mixture flowing through the constricted opening 604 also falls, the pressure in the heater falls, and this increases the steam formation and restores the balance.

In practice, with a certain setting of the steam proportion controller 401, the pressure shown by the gage 450 is quite constant, the nozzle 601 serving to regulate the rate of steam formation so that the pressure remains nearly constant.

The nozzle 601 can be readily disconnected from the pipe 406 and one having a larger or smaller opening 604 can be substituted if desired. The opening 604 in the nozzle 601 should be of such size that in the operation of the apparatus a considerable drop in pressure on the soap occurs as it passes therethrough, and the proper size of this opening can be readily determined by trial, the smaller the opening 604, the higher the pressure necessary to drive the mixture through the opening 604.

The nozzle 601 also acts as a jet director causing the mixture of soap and steam to emerge into the space 702 at considerable velocity. The jet expands as it leaves the nozzle, blowing the mass of soap apart into small particles which settle slowly through the space 702.

The function of the expansion chamber 701 is to allow the jet to expand and the steam to escape from the soap. The steam is constantly withdrawn by the blower 803 passing through the dust separator 801 in which any fine particles of soap carried by the steam are removed. Air which enters the expansion chamber 701 through the openings 704 is, of course, also removed by the blower 803. If desired, the openings 704 may be closed and a partial vacuum established in the space 702 by the blower 801, but as a matter of convenience it is probably better to allow air to enter the space 702 through the openings 704 so that the space 702 is at substantially atmospheric pressure.

The larger soap particles of course settle in the bottom of the expansion chamber 701, being withdrawn from time to time through the opening 706 by withdrawing the gate 707. The finer particles are separated in the dust collector 801, being withdrawn from time to time through the opening 805 by withdrawing the gate 806.

The operation of the process can be better understood if we describe the operation of a plan capable of converting about a gallon per minute of fat into soap. Such a plant would have a coil 302 about 400 feet long and consisting of pipe having an internal diameter of about one-half inch. Operating with a certain mixture of animal tallow, soy bean, and cocoanut oil, the fat is heated in the tank 111 to a temperature well in excess of that necessary to render it sufficiently fluid to pump readily. A reagent solution of caustic soda in water is prepared in the tank 121, this solution having a specific gravity of 37 degrees Baumé. The valve 115 is set to allow one gallon of fat per minute to pass into the pipe 113 and the valve 125 is set to allow sufficient reagent to pass into the pipe 123 to completely saponify the fat. A chemist skilled in the art can determine the exact proportion, which depends upon the nature of the fat. In the case being considered the valve 125 is set to allow about one-half gallon per minute of reagent to pass into the pipe 123.

A nozzle 601 is selected which will force a pressure of from 200 to 250 pounds per square inch (gage) to be indicated on the gage 450. The temperature indicated by the thermometer 460 will be the saturated steam temperature for the pressure indicated by the gage 450, or, in the case above considered, about 400° F. If dry soap is desired, the apparatus can be adjusted so that all the water in the soap is vaporized before the soap enters the nozzle 601, and so that the steam produced by this vaporization is slightly superheated.

It is possible by considerably superheating the steam to produce a soap containing less than 2% of water.

Operating with the thermometer 460 indicating the temperature of saturated steam at the pressure indicated by the gage 450, the moisture content of the powdered soap delivered at the opening 706 may be regulated by adjusting the steam proportion controller 401 by turning the handle 439.

If the handle is turned to pull the valve disc 412 away from the seat 420, the average temperature of the tube 402 must be raised to force the valve disc 412 against the seat 420.

The temperature of the soap flowing through the tube 402 will not be changed from the temperature of saturated steam at the pressure indicated by the gage 450 as long as this pressure is not changed and both water and saturated steam are present in the soap.

By moving the handle 439 to pull the valve disc 412 away from the seat 420, more fuel is allowed to flow to the burner 501 and more heat is applied to the coil 302. This causes more steam to be vaporized and increases the amount of saturated steam in the soap in the tube 302. The heat transfer from the interior of the tube 402 to the soap falls and the mean temperature of the tube 402 rises, thus expanding the tube, moving the valve disc 412 towards the seat 420, and reducing the flow of fuel to the burner. A balance is almost instantly established with the soap at a slightly higher pressure indicated on the gage 450 due to the additional friction in the opening 604 which is due to the greater volume of steam and a slightly higher temperature indicated on the thermometer 460, this higher temperature being, of course, due to the higher vaporization point of the water at the higher temperature.

In practice the proportion of saturated steam in the soap emerging from the nozzle 601 into the chamber 702 can be regulated by the operator by adjusting the steam proportioning device 401 so that all or none of the water originally added to the reagent appears as steam or any portion therebetween.

This enables the operator to accurately control the water content of the powdered soap delivered through the openings 706 and 805 from merely a trace to an amount nearly equal to the total water content of the original reagent solution. The soap is produced due to the action of the jet as it emerges from the nozzle 601 in the form of irregular shaped granules having a variable size of which the largest are not as large as a grain of rice. The granules can be reduced to flake form by passing them through a pair of rolls or can be readily pressed into cakes.

If it is desired to add to the soap inert material such as various detergents, they can be uniformly mixed with the fat or reagent in the tanks 111 or 121 and will appear uniformly distributed in the final product.

In the actual operation of the apparatus as above described in the manner above described, soap having a moisture content of about two per cent was produced at the rate of about five hundred pounds an hour, the total time required from the time the mixture left the mixer 201 to the time the finished soap emerged from the nozzle 601 being less than six minutes.

The soap produced was of very high quality, the high temperature and pressure combined with the thorough mixture of the ingredients due to the turbulent flow in the coil 302 having produced a complete reaction between the reagent and fat.

We have also found that by our process fats, such as certain kinds of vegetable oils, which are extremely difficult to saponify by ordinary soap boiling processes can be quickly, cheaply, and completely saponified.

This application is a continuation in part of our application Serial 568,278, filed October 12, 1931, and entitled "Soap manufacturing".

We claim as our invention:

1. The herein described process of manufacturing substantially solid soap adapted for general cleaning purposes as a continuous process, the steps which comprise continuously forcing a mixture of saponifiable fat and a saponifying alkali to flow through a reaction zone comprising an elongated passageway of restricted cross-sectional dimensions, subjecting the stream to substantially constant frictional resistance during its flow through the reaction zone whereby to maintain a substantially constant superatmospheric pressure thereon, applying heat to the advancing stream of material whereby to effect uniform saponification of the mixture and constantly discharging the heated reaction product from said zone to a low pressure zone wherein the heat of the reaction product is utilized to assist in the vaporization thereof.

2. The herein described process of making soap which comprises the steps of continuously introducing, under pressure, a saponifiable fat and a saponifying alkali to an elongated tortuous reaction zone of restricted cross-sectional dimensions, supplying heat to said zone to maintain the mixture at any point within said zone at a substantially constant temperature below the scorching or burning temperature of the mixture while maintaining pressure at any point within the zone substantially constant and continuously discharging the saponified product from said heating zone, to produce a substantially solid soap adapted for general cleaning purposes.

3. A continuous process for producing substantially solid soap adapted for general cleaning purposes comprising the steps of advancing under pressure a mixture of a saponifiable fat and a saponifying alkali as a continuously advancing stream through an elongated heating zone of restricted cross-section wherein the fat and alkali react to effect saponification, in effecting such saponification by supplying heat to said zone to maintain the advancing stream of said fat and alkali under a substantially constant temperature as said stream advances through the heating zone, and in maintaining a substantially constant superatmospheric pressure on the advancing stream undergoing treatment in said heating zone.

4. The herein described process of manufacturing substantially solid soap adapted for general cleaning purposes as a continuous process, the steps which comprise introducing alkali and fats to a reaction zone comprising an elongated passageway of restricted cross-sectional dimensions, subjecting the advancing stream of material to sufficient heat and pressure conditions to effect saponification during its passage through said reaction zone, and in maintaining the temperature and pressure conditions to which the advancing stream of said materials passing through the reaction zone are subjected, substantially constant.

5. The herein described process of manufacturing soap as a continuous process, the steps which comprise introducing alkali and fats to a reaction zone comprising an elongated passageway of restricted cross-sectional dimensions, subjecting the advancing stream of material to sufficient heat and pressure conditions to effect saponification during its passage through said reaction zone, in maintaining the temperature and pressure conditions to which the advancing stream of said material passing through the reaction zone are subjected substantially constant and in continuously discharging the reaction product into a zone of reduced pressure while under a temperature sufficient to effect therein at least partial vaporization of the contained volatiles, to produce a substantially solid soap adapted for general cleaning purposes.

6. A continuous process for producing soap comprising the steps of advancing, under pressure, a saponifiable fat and a saponifying alkali, as a continuously advancing stream, through an elongated reaction zone of restricted cross-section wherein the fat and alkali react to effect saponification, in effecting such saponification by supplying heat to said zone and maintaining the advancing stream under superatmospheric pressure during its passage through the zone, and continuously discharging the saponified material from the reaction zone while in a heated condition and utilizing the heat thereof to separate from the saponified material at least a portion of its water and other products of vaporization thereof to produce a substantially solid soap adapted for general cleaning purposes.

7. The herein described process of manufacturing soap as a continuous process, the steps which comprise continuously forcing a mixture of saponifiable fat and a saponifying alkali to flow through a reaction zone comprising an elongated passageway of restricted cross-sectional dimensions, subjecting the stream to substantially constant frictional resistance during its flow through the reaction zone whereby to maintain superatmospheric pressure thereon while applying heat to the advancing stream of material to effect saponification thereof and constantly discharging the heated reaction product from said zone, to produce a substantially solid soap adapted for general cleaning purposes.

8. A continuous process for producing soap which comprises forcing a saponifiable fat and a water solution of a saponifying alkali to flow, as a continuously advancing stream, under pressure, through an elongated heating zone wherein the fat and alkali change to form soap and other products, maintaining the pressure at any point within said zone substantially constant, supplying sufficient heat to said zone to raise the temperature in said zone to the vaporization point of the water therein at the pressure therein and form a controlled portion of vapor in said zone, and discharging said soap, vapor and other products from said zone to produce a substantially solid soap adapted for general cleaning purposes.

9. A continuous process of producing substantially solid soap adapted for general cleaning purposes which comprises forcing a mixture of saponifiable fat and a water solution of a saponifying alkali to flow as a continuous stream through an elongated heating zone of restricted cross-section, supplying heat to said flowing stream whereby the fat and alkali react to form soap and other products discharging said products from the heating zone while in a heated condition and utilizing the heat thereof to separate from the soap at least a portion of the water and said other products by vaporization thereof.

10. A continuous process of making soap which comprises forcing a mixture of saponifiable fat and saponifying alkali to flow, under pressure, continuously through an elongated reaction zone as a stream, supplying heat to said reaction zone whereby the fat and alkali react to form a soap solution, while maintaining a substantially constant superatmospheric pressure thereon, constantly discharging said solution from the heating zone, and introducing it to a zone having a lower pressure than that of the heating zone and utilizing the heat supplied in said heating zone to separate by evaporation at least a portion of the volatiles contained in said soap solution from said soap, to produce a substantially solid soap adapted for general cleaning purposes.

11. A continuous process of making substantially solid soap adapted for general cleaning purposes which comprises the steps of forcing a mixture of saponifiable fat and saponifying alkali to flow, under pressure, continuously through a reaction zone comprising an elongated passageway of restricted cross-sectional dimensions, supplying heat to said reaction zone whereby the fat and alkali react to form a soap solution, discharging said solution from said heating zone into a zone having a lower pressure than that of the heating zone, utilizing the heat supplied in said heating zone to separate by vaporization at least a portion of the volatiles contained in said soap solution from said soap, and regulating the temperature and pressure of the lower pressure zone to produce substantially solid soap of predetermined character.

12. A continuous process of making soap which comprises the steps of forcing a mixture of saponifiable fat and saponifying solution to flow under pressure as a continuous stream through a reaction zone comprising an elongated passageway of restricted cross-sectional dimensions wherein the fat and alkali react to form a soap solution, supplying sufficient heat to said zone to raise the temperature thereof at the vaporization point of the volatile components of said solution at the pressure within said zone to form a controlled portion of vapor within said zone, discharging said solution and vapor into an evaporating zone and utilizing the heat supplied to said heating zone to separate by evaporation at least a portion of said volatiles from said soap to produce a substantially solid soap adapted for general cleaning purposes.

13. A continuous process of making soap which comprises forcing a mixture of a saponifiable fat and a saponifying alkali solution to flow, under pressure, as a continuously advancing stream, through a reaction zone comprising an elongated passageway of restricted cross-sectional dimensions, supplying sufficient heat to said zone to raise the temperature thereof to the vaporization point of the volatile components of said solution at the pressure within said zone and form a controlled portion of vapor within said zone, discharging said solution and vapor into a zone having a lower pressure than said heating zone, utilizing the heat supplied to said heating zone to separate by vaporization at least a portion of said volatiles from said soap and regulating the temperature and pressure of the lower pressure zone to produce substantially solid soap adapted for general cleaning purposes of predetermined dryness.

14. A continuous process for producing soap which comprises the steps of advancing under pressure a saponifiable fat and a saponifying alkali, as a continuously advancing stream through an elongated reaction zone of restricted cross-section wherein the fat and alkali react to effect saponification, and effecting such saponification by supplying the heat to said zone and maintaining the advancing stream under superatmospheric pressure during its passage through the zone, continuously discharging the saponified material from the reaction zone while in a heated condition, introducing it to an evaporating zone maintained under subatmospheric pressure conditions, and utilizing the heat thereof to separate from the saponified material at least a portion of its water and other products of vaporization thereof to produce a substantially solid soap, in finely divided form, adapted for general cleaning purposes.

15. A continuous process for producing soap which comprises the steps of advancing under pressure a saponifiable fat and a saponifying alkali, as a continuously advancing stream, through an elongated reaction zone of restricted cross-section wherein the fat and alkali react to effect saponification, and effecting such saponification by supplying the heat to said zone and maintaining the advancing stream under superatmospheric pressure during its passage through the zone, continuously discharging the saponified material from the reaction zone while in a heated condition, introducing it to an evaporating zone maintained at a pressure not substantially exceeding atmospheric pressure, and utilizing the heat thereof to separate from the saponified material at least a portion of its water and other products of vaporization thereof to produce a substantially solid soap adapted for general cleaning purposes.

16. A continuous process for producing soap which comprises the steps of advancing under pressure a saponifiable fat and a saponifying alkali, as a continuously advancing stream, through an elongated reaction zone of restricted cross-section wherein the fat and alkali react to effect saponification, and effecting such saponification by supplying the heat to said zone and maintaining the advancing stream under superatmospheric pressure during its passage through the zone, continuously discharging the saponified material from the reaction zone while in a heated condition, varying the quantity of heat supplied to the reaction zone in accordance with the thermal conditions of the reaction product being discharged, and utilizing the heat thereof to separate from the saponified material at least a portion if its water and other products of vaporization thereof to produce a substantially solid soap adapted for general cleaning purposes.

17. A continuous process for making soap which comprises the steps of forcing a mixture of saponifiable fat and saponifying solution to flow under pressure as a continuous stream, through a reaction zone, comprising an elongated passageway of restricted cross-sectional dimensions wherein the fat and alkali react to form a soap solution, supplying sufficient heat to said zone to raise the temperature thereof to the vaporization point of the volatile components of said solution at the pressure within said zone to form a controlled portion of vapor within said zone, regulating the application of heat supplied to the reaction zone to vary the proportion of saturated vapor generated therein, discharging the solution and vapor into the vapor space of an evaporating zone and utilizing the heat supplied to said heating zone to separate by evaporation at least a portion of said volatiles from said soap whereby to produce a substantially solid soap adapted for general cleaning purposes.

18. A continuous process for producing soap which comprises the steps of advancing under pressure and in separated streams a saponifiable fat and saponifying alkali, combining the moving streams and passing the resultant mixture through an elongated reaction zone of restricted cross-section wherein the fat and alkali react to effect saponification, in effecting such saponification by supplying heat to said zone and maintaining the advancing stream under superatmospheric pressure during its passage through the zone, and continuously discharging the saponified Search Room material from the reaction zone while in a heated condition and utilizing the heat thereof to separate from the saponifiable material at least a portion of its water and other products of vaporization thereof to produce a substantially solid soap adapted for general cleaning purposes.

19. A continuous process for producing soap comprising the steps of advancing under pressure a saponifiable fat and a saponifying alkali, as a continuously advancing stream, introducing the same simultaneously to an elongated reaction zone of restricted cross-section wherein the fat and alkali react to effect saponification, and effecting saponification by supplying heat to said zone and maintaining the advancing stream under superatmospheric pressure during its passage through the zone and continuously discharging the saponified material from the reaction zone while in a heated condition and utilizing the heat thereof to separate from the saponifiable material at least a portion of its water and other products of vaporization thereof to produce a substantially solid soap adapted for general cleaning purposes.

20. The herein described continuous process of producing soap having a definite and controlled water content, directly from a saponifiable material by reaction with an aqueous solution of saponifying reagent, which comprises: forcing a properly proportioned hot mixture of said material and said reagent to flow through a reaction zone of sufficiently small cross section to produce a relatively high velocity and turbulence therein in which said reagent reacts with said material to form soap; continuously ejecting the heated mixture containing the products of said reaction, and including the soap so formed, into a space in which water vapor is allowed to escape from said soap; and controlling the moisture content of the finished soap by controlling the temperature of the material so ejected and thus controlling the amount of water which is so vaporized.

21. The herein described continuous process of producing soap having a definite and controlled water content, directly from a saponifiable material by reaction with an aqueous solution of saponifying reagent, which comprises: forcing a properly proportioned hot mixture of said material and said reagent to flow through a reaction zone of sufficiently small cross section to produce a relatively high velocity and turbulence therein in which said reagent reacts with said material to form soap; continuously ejecting the heated mixture containing the products of said reaction, and including the soap so formed, into a space in which water vapor is allowed to escape from said soap, said ejection taking place through a constricted orifice of sufficiently small size to enable a substantial pressure to be maintained in said reaction zone; and controlling the moisture content of the finished soap by controlling the temperature of the material so ejected and thus controlling the amount of water which is so vaporized.

22. The herein described process of continuously producing soap having a definite and controlled water content directly from a saponifiable material by reaction with an aqueous solution of a saponifying reagent which comprises: forcing a properly proportioned mixture of said material and said reagent to flow through a reaction zone of sufficiently small cross section to produce a relatively high velocity and turbulence therein in which said reagent reacts with said material to form soap; transferring heat to said mixture while in said zone from a suitable heating medium; continuously passing the products of the reaction including the soap, so formed into a space in which a definite portion of the water escapes from said soap; and controlling the proportion of the water which so escapes by controlling the amount of heat transferred from said heating medium to said mixture in said reaction zone and thus controlling the temperature of the products of said reaction as they enter said space.

23. A process of continuously producing a granular soap, having a definite and controlled water content, directly from a saponifiable material by reaction with an aqueous solution of saponifying reagent, which comprises: forcing a properly proportioned mixture of said material and said solution to flow through a reaction zone of sufficiently small cross section to produce a relatively high velocity and turbulence therein in which said reagent reacts with said material to form soap; transferring sufficient heat from a suitable heating medium to said mixture while in said zone to vaporize a portion of the water of said solution if it were at atmospheric pressure the materials in said zone being held at a higher pressure; utilizing said pressure to continuously eject the materials from said zone into a space at lower pressure, said ejection forming a jet in which the soap is in the form of granules, having a definite water content, mixed with water vapor; and allowing the water vapor to escape from said jet without recombining with the soap granules.

24. The herein described continuous process of producing soap having a definite and controlled water content, directly from a saponifiable material by reaction with an aqueous solution of saponifying reagent, which comprises: forcing a properly proportioned hot mixture of said material and said reagent to flow through a reaction zone in which said reagent reacts with said material to form soap; continuously ejecting the heated mixture containing the products of said reaction, and including the soap so formed, into a space maintained under partial vacuum and in which the heat contained in said mixture is utilized to assist vaporization, said ejection taking place through a constricted orifice of sufficiently small size to enable a substantial pressure to be maintained in said reaction zone; and controlling the moisture content of the finished soap by controlling the temperature of the material so ejected and thus controlling the amount of water which is so vaporized.

25. The herein described process of continuously producing soap having a definite and controlled water content directly from a saponifiable material by reaction with an aqueous solution of a saponifying reagent which comprises: forcing a properly proportioned mixture of said material and said reagent to flow through a reaction zone in which said reagent reacts with said material to form soap; transferring heat to said mixture while in said zone from a suitable heating medium; continuously passing the products of the reaction including the soap so formed into a space maintained under a partial vacuum and in which the heat contained in said mixture is utilized to produce vapors; and controlling the proportion of vapors so produced by controlling the amount of heat transferred from said heating medium to said mixture in said reaction zone and thus controlling the temperature of the products of said reaction as they enter said space.

26. A continuous process of producing soap which comprises the steps of causing saponifiable fat and saponifying material to flow under pressure through a reaction zone, applying sufficient heat and pressure to said flowing materials to produce a relatively high temperature substantially in excess of the boiling point of water at atmospheric pressure, while maintaining a substantial superatmospheric pressure on the materials as they are forced through the reaction zone so as to substantially completely saponify the fat and thus form soap, continuously introducing the resultant products, while in their thus heated condition, into an evaporating zone, utilizing the heat thereof to assist in evaporating at least a portion of the volatile constituents of said resultant products, and maintaining a sub-atmospheric pressure in said evaporating zone.

27. A process of producing soap which comprises the steps of causing saponifiable fat and saponifying material to flow under pressure through a reaction zone, applying sufficient heat and pressure to said flowing materials to produce a relatively high temperature substantially in excess of the boiling point of water at atmospheric pressure, while maintaining a substantial superatmospheric pressure on the materials as they are forced through said reaction zone so as to generate substantial quantities of steam in the reaction zone and to substantially completely saponify the fat and thus form soap, continuously introducing the resultant products, in their thus heated condition, into an evaporating zone, utilizing the heat thereof to assist in evaporating at least a portion of the volatile constituents of said resultant products, and maintaining a sub-atmospheric pressure in said evaporating zone.

28. A continuous process for producing soap which comprises the steps of advancing, under pressure, a saponifiable material and a saponifying material, as a continuously advancing stream, through an elongated reaction zone of restricted cross section, wherein the materials react to effect substantially complete saponification, and effecting such saponification by supplying heat to said zone and maintaining the advancing stream under superatmospheric pressure during its passage through the zone, continuously discharging the saponified material from the reaction zone, while in a heated condition, introducing it into an evaporating zone maintained under sub-atmospheric pressure conditions and utilizing the heat thereof to separate from the saponified material at least a portion of the vaporizable constituents thereof to produce a soap product consisting predominantly of saponified material.

29. The herein described process of manufacturing soap of a character consisting predominantly of saponified material, as a continuous process, the steps which comprise introducing alkali and saponifiable material to a reaction zone comprising an elongated passageway of restricted cross sectional dimensions, subjecting the advancing stream of materials to sufficient heat and pressure conditions to effect saponification during its passage through said reaction zone, and in maintaining the temperature and pressure conditions to which the advancing stream of said materials passing through the reaction zone are subjected, substantially constant, to produce a product consisting predominantly of saponified material.

30. A continuous process for producing soap which comprises the steps of causing saponifiable and saponifying materials to flow, as a continuously advancing stream, through a reaction zone, applying sufficient heat to said flowing stream to vaporize substantially all of the water contained therein and to effect substantial saponification of said materials as they advance through said reaction zone, continuously introducing the resultant reacted products, including the generated water vapor, into an evaporating zone while in a heated condition, and maintaining the temperature and pressure conditions therein to evaporate volatile constituents of said resultant products in said evaporating zone.

31. The herein described process of manufacturing soap which is substantially solid at atmospheric temperature, as a continuous process, the steps which comprise introducing alkali and saponifiable material to a reaction zone comprising an elongated passageway of restricted cross sectional dimensions, subjecting the advancing stream of material to sufficient heat and pressure conditions to effect saponification during its passage through said reaction zone, and in maintaining the temperature and pressure conditions to which the advancing stream of said materials passing through the reaction zone are subjected, substantially constant.

32. A continuous process for producing soap comprising the steps of advancing, under pressure, a saponifiable material and a saponifying alkali, as a continuously advancing stream, through an elongated reaction zone of restricted cross section wherein the saponifiable material and alkali react to effect saponification, in effecting said saponification by supplying heat to said zone and maintaining the advancing stream under superatmospheric pressure during its passage through the zone, and continuously discharging the saponified material from the reaction zone while in a heated condition and utilizing the heat thereof to separate from the saponified material at least a portion of the vaporizable constituents thereof to produce a soap which is substantially solid at atmospheric temperature.

33. The herein described process of manufacturing soap of a character consisting substantially entirely of saponified material, as a continuous process, the steps which comprise introducing saponifiable and saponifying materials to a reaction zone, comprising an elongated passageway, forcing said materials to flow through said reaction zone as a stream, and under a sufficiently high velocity as to maintain them in a state of turbulence while undergoing treatment to permit the use of relatively high temperatures in the reaction zone, subjecting the advancing stream of materials to relatively high temperature and pressure conditions to effect substantially complete saponification of the rapidly advancing stream, without scorching, during its passage through said reaction zone, and maintaining the temperature and pressure conditions to which the advancing stream of said materials passing through the reaction zone are subjected, substantially constant, to produce a soap product consisting substantially entirely of saponified material.

34. The herein described process of manufacturing soap of a character consisting substantially entirely of saponified material, as a continuous process, the steps which comprise introducing saponifiable and saponifying materials to a reaction zone, comprising an elongated passageway, forcing said materials to flow through said reaction zone, as a stream, and under sufficiently high velocity as to maintain them in a state of turbulence while undergoing treatment to per- Serc mit the use of relatively high temperatures in the reaction zone, subjecting the advancing stream of materials to relatively high temperature and pressure conditions to effect substantially complete saponification of the rapidly advancing stream, without scorching, during its passage through said reaction zone, and in maintaining the temperature to which the advancing stream of said materials passing through the reaction zone are subjected, substantially constant, to produce a soap product consisting substantially entirely of saponified material.

35. The herein described process of manufacturing soap of a character consisting essentially of saponified material, as a continuous process, the steps which comprise introducing saponifiable and saponifying materials to a reaction zone comprising an elongated passageway, forcing said materials through the reaction zone, as a stream, under sufficiently high velocity to maintain them in a state of turbulence while undergoing treatment to permit the use of relatively high temperatures in the reaction zone, subjecting the advancing stream of materials to relatively high temperature and pressure conditions to effect substantially complete saponification of the rapidly advancing stream, without scorching, and to generate substantial amounts of steam therein during its passage through said reaction zone, and maintaining the temperature to which the advancing stream of materials, passing through the reaction zone, are subjected, substantially constant, to produce a soap product consisting predominantly of saponified material.

36. A continuous process for producing soap of a character consisting predominantly of saponified material, comprising the steps of advancing, under pressure, a saponifiable material and a saponifying material, as a continuously advancing stream, through an elongated reaction zone of restricted cross section wherein the saponifiable material and the saponifying material react to effect substantially complete saponification, and effecting such saponification by supplying heat to said zone, and maintaining the advancing stream under superatmospheric pressure during its passage through the zone, and continuously discharging the saponified material from the reaction zone in an expansion chamber, while in a heated condition, and utilizing the heat thereof to separate from the saponified material at least a portion of the vaporizable constituents thereof to produce a soap consisting predominantly of saponified material.

37. A continuous process of producing soap which comprises the steps of: causing a properly proportioned mixture containing water, a saponifiable material, and a saponifying reagent to flow under pressure through a reaction zone at a sufficiently high velocity to produce sufficient turbulence in said mixture to produce rapid and progressive saponification in said reaction zone, and under a sufficiently high pressure to permit the use of relatively high temperatures; transferring heat to the advancing stream of said mixture while in said reaction zone in sufficient amounts to raise the temperature of said mixture above the boiling pont of water at atmospheric pressure and to generate substantial amounts of steam; continuously passing the resultant mixture of reacted products and steam in a highly dispersed condition into an evaporating chamber; and maintaining the temperature of the mixture where it leaves the reaction zone and enters the evaporating zone sufficiently high to cause sufficient evaporation of the vaporizable constituents of said mixture while in said evaporating chamber to produce a soap consisting predominantly of saponified material.

38. A continuous process for producing soap which comprises the steps of introducing saponifiable and saponifying materials, under pressure, into a reaction zone, applying sufficient heat and pressure to said materials to produce a relatively high temperature, highly in excess of the boiling point of water at atmospheric pressure, while continuously maintaining a substantial superatmospheric pressure on the material so as to rapidly and substantially uniformly saponify the same, during their passage therethrough, continuously discharging the thus uniformly saponified material from the reaction zone by the pressure maintained therein and introducing the same in their heated condition into an evaporating chamber and maintaining the temperature and pressure conditions therein sufficient to evaporate the vaporizable constituents from the reaction zone in the evaporating zone thereby to produce a soap consisting predominantly of saponified material.

BENJAMIN CLAYTON.
WALTER B. KERRICK.
HENRY M. STADT.